United States Patent
Kim et al.

(10) Patent No.: US 11,330,066 B2
(45) Date of Patent: May 10, 2022

(54) METHOD FOR RECEIVING CONTENT FROM EXTERNAL DEVICE AND ELECTRONIC DEVICE THEREFOR

(71) Applicant: SAMSUNG ELECTRONICS CO., LTD., Suwon-si (KR)

(72) Inventors: Tae-Jeoung Kim, Hwaseong-si (KR); Ki-Chul Park, Yongin-si (KR); Jin-Woo Song, Seoul (KR); Hong-Uk Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 782 days.

(21) Appl. No.: 16/073,094

(22) PCT Filed: Jan. 25, 2017

(86) PCT No.: PCT/KR2017/000892
§ 371 (c)(1),
(2) Date: Jul. 26, 2018

(87) PCT Pub. No.: WO2017/131440
PCT Pub. Date: Aug. 3, 2017

(65) Prior Publication Data
US 2021/0211508 A1 Jul. 8, 2021

(30) Foreign Application Priority Data
Jan. 29, 2016 (KR) .................. 10-2016-0011864

(51) Int. Cl.
*H04L 29/08* (2006.01)
*G06F 16/955* (2019.01)
(Continued)

(52) U.S. Cl.
CPC ............ *H04L 67/16* (2013.01); *G06F 16/955* (2019.01); *G06F 40/134* (2020.01); *G06Q 50/10* (2013.01);
(Continued)

(58) Field of Classification Search
CPC ... H04L 67/16; H04L 67/322; H04L 47/2441; H04L 12/2814; H04L 12/282; H04L 29/08; G06Q 50/10; G06F 40/134; G06F 16/955
See application file for complete search history.

(56) References Cited

U.S. PATENT DOCUMENTS

| 7,620,703 B1 | 11/2009 | Shteyn |
| 2003/0018753 A1 | 1/2003 | Seki |

(Continued)

FOREIGN PATENT DOCUMENTS

| CN | 102110357 A | 6/2011 |
| CN | 102415104 A | 4/2012 |

(Continued)

OTHER PUBLICATIONS

English Translation of Hiromichi et al., JP 2014-14187 A, "To realize a remote control system that can operate home appliances in a home with a simple operation from a mobile phone", Jan. 23, 2014, 12 pages. (Year: 2014).*

(Continued)

*Primary Examiner* — Arvin Eskandarnia
*Assistant Examiner* — Chhian (Amy) Ling
(74) *Attorney, Agent, or Firm* — Sughrue Mion, PLLC

(57) ABSTRACT

According to one embodiment of the present invention, a method for receiving content at an electronic device may include: receiving content including at least one object from a web server; in response to the object being selected, acquiring, from the object, device information indicating at (Continued)

least one first device related the object and device control information including a first command for operating the at least one first device; and transmitting the first command to the at least one first device. In addition, other examples are also possible.

13 Claims, 12 Drawing Sheets

(51) Int. Cl.
*G06F 40/134* (2020.01)
*G06Q 50/10* (2012.01)
*H04L 12/28* (2006.01)
*H04M 1/72415* (2021.01)
*H04M 1/72469* (2021.01)
*H04L 67/51* (2022.01)
*H04M 1/72412* (2021.01)
*H04N 21/858* (2011.01)
*H04L 67/025* (2022.01)

(52) U.S. Cl.
CPC ........ *H04L 12/282* (2013.01); *H04L 12/2814* (2013.01); *H04L 67/025* (2013.01); *H04M 1/72412* (2021.01); *H04M 1/72415* (2021.01); *H04M 1/72469* (2021.01); *H04N 21/858* (2013.01)

(56) References Cited

U.S. PATENT DOCUMENTS

| | | | |
|---|---|---|---|
| 2003/0171135 A1 | 9/2003 | Brune et al. | |
| 2004/0010327 A1 | 1/2004 | Terashima et al. | |
| 2004/0255018 A1* | 12/2004 | Taraci | H04L 41/026 709/223 |
| 2008/0098441 A1 | 4/2008 | Son | |
| 2008/0120408 A1 | 5/2008 | Kim | |
| 2010/0219976 A1 | 9/2010 | Park et al. | |
| 2011/0157004 A1 | 6/2011 | Ohashi | |
| 2012/0119888 A1 | 5/2012 | Reeves et al. | |
| 2012/0155643 A1 | 6/2012 | Hassan et al. | |
| 2013/0005250 A1* | 1/2013 | Kim | H04N 21/4126 455/41.1 |
| 2013/0080646 A1* | 3/2013 | Berkoff | H04L 69/329 709/228 |
| 2013/0198638 A1* | 8/2013 | Na | H04L 67/16 715/736 |
| 2014/0304611 A1 | 10/2014 | Guo | |
| 2015/0195365 A1 | 7/2015 | Choi et al. | |
| 2016/0188733 A1* | 6/2016 | Glover | G06F 16/24578 707/724 |
| 2018/0234496 A1* | 8/2018 | Ratias | A63F 13/60 |
| 2020/0013291 A1* | 1/2020 | Rosas-Maxemin | G07B 15/02 |

FOREIGN PATENT DOCUMENTS

| | | | |
|---|---|---|---|
| CN | 102427457 A | 4/2012 | |
| CN | 102571914 A | 7/2012 | |
| CN | 103019120 A | 4/2013 | |
| CN | 105245377 A | 1/2016 | |
| JP | 2003-30072 A | 1/2003 | |
| JP | 2003-208366 A | 7/2003 | |
| JP | 2014-14187 A * | 1/2014 | ............... H04Q 9/00 |
| JP | 2015-122805 A | 7/2015 | |
| KR | 2002-0047218 A | 6/2002 | |
| KR | 2003-0032027 A | 4/2003 | |
| KR | 2003-0096030 A | 12/2003 | |
| KR | 10-0739810 B1 | 7/2007 | |
| KR | 10-1148828 B1 | 5/2012 | |

OTHER PUBLICATIONS

Communication dated May 26, 2021 by the State Intellectual Property Office of P.R. China in counterpart Chinese Patent Application No. 201780008645.1 (Year: 2021).*
Search Report dated Mar. 29, 2017, issued by the International Searching Authority in counterpart International Patent Application No. PCT/KR2017/000892 (PCT/ISA/210).
Written Opinion dated Mar. 29, 2017, issued by the International Searching Authority in counterpart International Patent Application No. PCT/KR2017/000892 (PCT/ISA/237).
Communication dated May 26, 2021 by the State Intellectual Property Office of P.R. China in counterpart Chinese Patent Application No. 201780008645.1.

* cited by examiner

METHOD FOR RECEIVING CONTENT FROM EXTERNAL DEVICE AND ELECTRONIC DEVICE THEREFOR

CROSS-REFERENCE TO RELATED APPLICATION(S)

This application is a National Phase Entry of PCT International Application No. PCT/KR2017/000892, which was filed on Jan. 25, 2017, and claims priority to Korean Patent Application No. 10-2016-0011864, which was filed on Jan. 29, 2016, the contents of which are incorporated herein by reference.

BACKGROUND

1. Field

The present disclosure generally relates to a method in which an electronic device receives content from an external device.

2. Description of the Related Art

Linking methods used to construct a web page include hyperlinks, among which deep linking refers to links that can reach a specific page or a specific location within a web site. Assuming that a user browses a web page using a mobile phone, the user can reach a specific page of an application providing web pages using mobile deep linking. Such mobile deep linking means that, when an image indicating playback of a specific piece of music contained in a web page is selected, the mobile phone executes the music player in response to the selection of the image and then plays the specific piece of music.

SUMMARY

Mobile deep linking may include control information for executing the corresponding application within the web page. A service provider providing the web page may provide the web page with the control information for executing the application in the web page. A technique may be developed in which information for controlling home devices (e.g., home appliances) in a manner desired by a user of a mobile phone (electronic device) is received from a content provider using such a linking method.

According to aspects of the present disclosure, a method for receiving content from an external device, for example, a content provider, and an electronic device therefor are provided.

In accordance with an aspect of the present disclosure, a method for receiving content at an electronic device may include: receiving content including at least one object from a web server; in response to the object being selected, acquiring, from the object, device information indicating at least one first device related the object and device control information including a first command for operating the at least one first device; and transmitting the first command to the at least one first device.

In accordance with another aspect of the present disclosure, an electronic device for receiving content may include: a communication interface; and a processor configured to control to: receive content including at least one object from a web server, in response to the object being selected, acquire device information indicating at least one first device related to the object and device control information including a first command for operating the at least one first device, and control the communication interface to transmit the first command to the at least one first device.

In accordance with still another aspect of the present disclosure, a method for providing content at a server may include: providing, to an electronic device, a web page including an object including at least one command for controlling the operation of at least one first device; and associating device information indicating the at least one first device and device control information including a first command for operating the at least one first device, with the object, and transmitting the first command to the electronic device.

In accordance with yet another embodiment of the present disclosure, a server for providing content may include: a communication interface; and a processor configured to control to: provide, to an electronic device, a web page including an object including at least one command for controlling the operation of at least one first device, and associate device information indicating the at least one first device and device control information including a first command for operating the at least one first device, with the object, and control the communication interface to transmit the first command to the electronic device.

According to the present disclosure, it is possible to provide a method for receiving content from a content provider and an electronic device therefor.

DETAILED DESCRIPTION

Figure 1:
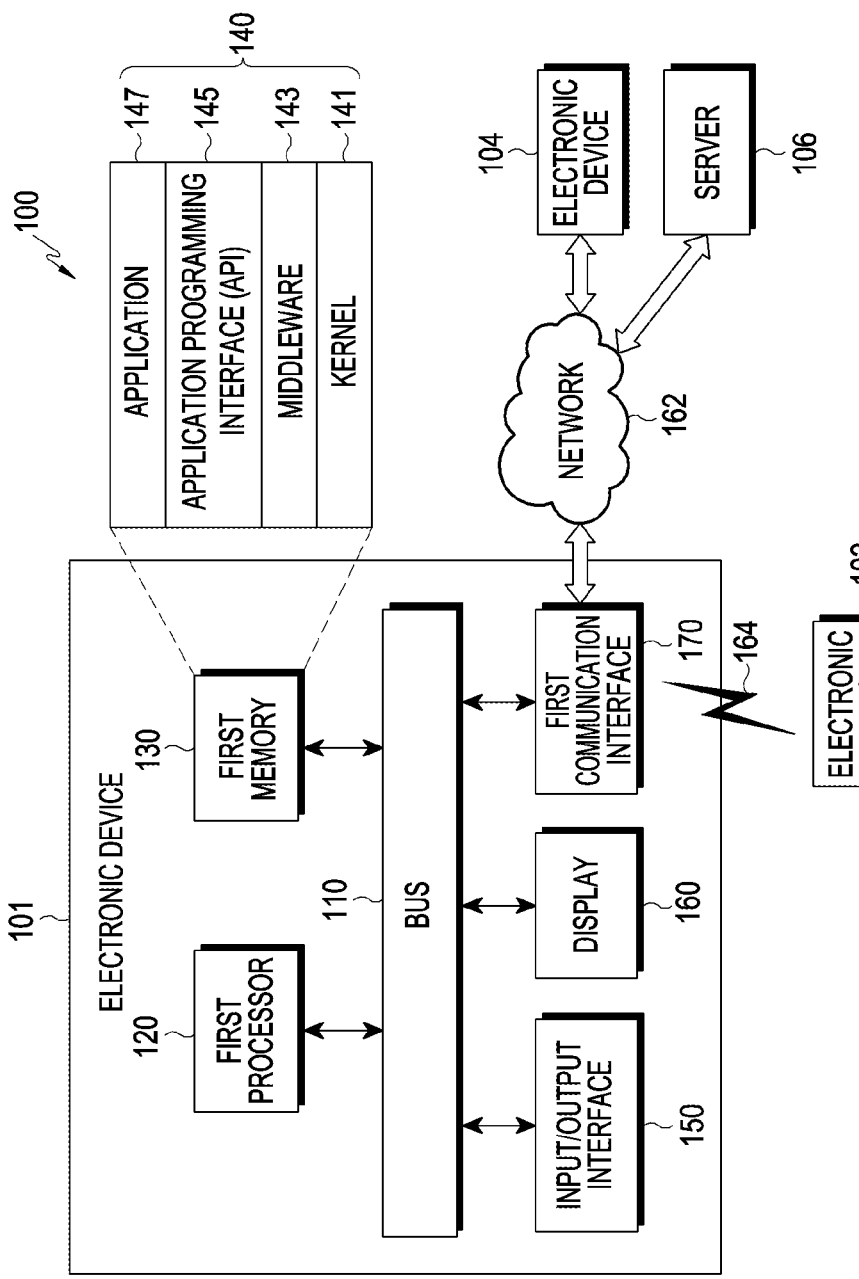
FIG. 1 is a diagram illustrating an example of a network environment including an electronic device according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B", "at least one of A or/and B", "one or more of A or/and B", and the like may include all combinations of the listed items. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured (or set) to", used in this specification, may be interchangeably used with, for example, "suitable for", "having the capacity to", "designed to", "adapted to", "made to", or "capable of" according to circumstances. The term "configured to" may not necessarily imply "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user"

may indicate a person using an electronic device or a device (e.g., an artificial intelligence electronic device) using an electronic device.

FIG. 1 is a diagram illustrating an example of a network environment including an electronic device according to various embodiments. Referring to FIG. 1, in various embodiments, an electronic device 101 in a network environment 100 is described.

The electronic device 101 may include a bus 110, a first processor 120, a first memory 130, an input/output interface 150, a display 160, and a first communication interface 170. In some embodiments, the electronic device 101 may omit at least one of the above-mentioned components, or may further include other components.

The bus 110 may include, for example, a circuit for interconnecting the components 120 to 170 and transmitting communication (e.g., control messages and/or data) between the components.

The first processor 120 may include one or more of a central processing unit (CPU), an application processor (AP), and a communication processor (CP). The first processor 120 may execute an arithmetic operation or data-processing that is related to control and/or communication of one or more other components of the electronic device 101.

According to one embodiment, the first processor 120 may control the first communication interface 170 to receive device control information from a web server (e.g., a server 106). The device control information may include device information indicating at least one device or a command (hereinafter, referred to as a first command) for operating the at least one device (hereinafter, referred to as a first device). The device information may include, for example, a type of a first device, a product name, a specification, information on a device capable of replacing the first device, and the like.

When the device control information is received by the first communication interface 170, the first processor 120 may acquire (or extract) the device information and the first command from the device control information. The first processor 120 may control the first communication interface 170 to transmit the first command to the first device. The first processor 120 may control the first communication interface 170 to transmit the first command to the first device according to user input or when a preset time elapses.

According to one embodiment, the first processor 120 may determine whether short-range communication between the electronic device 101 and the first device corresponding to the device information is possible. The electronic device 101 may be connected to one or more devices via short-range communication to perform wired or wireless communication. When the electronic device 101 cannot communicate with the first device via short-range communication, the first processor 120 may request an external device (e.g., the server 106), which is connected to the first device via the first communication interface 170, to transmit the first command to the first device. According to one embodiment, the first processor 120 may generate a request message including the device information and the first command. The first processor 120 may transmit the request message to the external device via the first communication interface 170.

According to one embodiment, the first processor 120 may discover devices connected to the electronic device 101. The first processor 120 may identify the devices connected to the electronic device 101 through the discovery operation. The first processor 120 may generate a list (hereinafter, referred to as a first list) for the discovered devices and may store the generated list in the first memory 130. The first list may include the name of each of the discovered devices or device information corresponding to each of the discovered devices.

The first processor 120 may determine whether the first device is included in the discovered devices. When the first device is included in the discovered devices, the first processor 120 may control the first communication interface 170 to transmit the first command to the first device. When the first device is not included in the discovered devices, the first processor 120 may determine a second device to replace the first device among the discovered devices. At this time, the first processor 120 may determine the second device based on information about a device capable of replacing the first device, among the device information. When the second device is determined, the first processor 120 may convert the first command into a second command that can be applied to the second device. The first processor 120 may control the first communication interface 170 to transmit the second command to the second device.

The first memory 130 may include a volatile memory and/or a non-volatile memory. The first memory 130 may store commands or data that are related to one or more other components of the electronic device 101.

According to one embodiment, the first memory 130 may store a list of the devices discovered by the electronic device 101, that is, a first list. The name of each of the devices or device information corresponding to each of the devices may be included in the first list. The first processor 120 may determine whether short-range communication between the electronic device 101 and the first device is possible based on the first list.

According to one embodiment, if device information about the first device is included in the first list, the first processor 120 may determine that short-range communication between the electronic device 101 and the first device is possible. If the device information about the first device is not included in the first list, the first processor 120 may determine that short-range communication between the electronic device 101 and the first device is impossible.

According to one embodiment, a list (hereinafter, referred to as a second list) for devices connected to the external device (e.g., the server 106), which is received from the external device, may be stored in the first memory 130. The second list may include the name of each of the devices connected to the external device and device information about each of the devices connected to the external device. The first processor 120 may identify the devices connected to the external device through the second list.

According to one embodiment, the first memory 130 may store software and/or a program 140. The program 140 may include, for example, a kernel 141, middleware 143, an application programming interface (API) 145, and/or an application program (or "applications") 147. At least one of the kernel 141, the middleware 143, and the API 145 may be referred to as an operating system (OS).

The kernel 141 may control or manage system resources (e.g., the bus 110, the first processor 120, or the first memory 130) that are used for executing operations or functions implemented in the other programs (e.g., the middleware 143, the API 145, or the applications 147). In addition, the kernel 141 may provide an interface that allows the middleware 143, the API 145, or the applications 147 to access individual components of the electronic device 101 so as to control or manage the system resources.

The middleware 143 may play an intermediary role such that the API 145 or the applications 147 may communicate with the kernel 141 so as to exchange data.

In addition, the middleware 143 may process, according to priority, one or more task requests that are received from the applications 147. For example, the middleware 143 may assign priority for using system resources (e.g., the bus 110, the first processor 120, or the first memory 130) of the electronic device 101 to at least one of the applications 147. For example, the middleware 143 may process the one or more task requests according to the priority assigned to the at least one of the applications 147, thereby performing scheduling or load balancing on the one or more task requests.

The API 145 allows the applications 147 to control functions provided from the kernel 141 or the middleware 143, and may include one or more interfaces or functions (e.g., instructions) for file control, window control, image processing, or character control.

The input/output interface 150 may serve as an interface that can transmit commands or data, which are entered from a user or other external devices, to the other component(s) of the electronic device 101. In addition, the input/output interface 150 may output commands or data, which are received from the other component(s) of the electronic device 101, to the user or the other external devices.

According to one embodiment, the input/output interface 150 may receive user input for selecting an object (e.g., text or image) associated with device control information among content (e.g., web page or the like) displayed through the display 160.

The display 160 may include a liquid crystal display (LCD), a light-emitting diode (LED) display, an organic light-emitting diode (OLED) display, a microelectromechanical system (MEMS) display, or an electronic paper display. The display 160 may display various content (e.g., text, image, video, icon, symbol, etc.) to a user. The display 160 may include a touch screen, and may receive a touch input, a gesture input, a proximity input, or a hovering input that is made using an electronic pen or a part of the user's body.

According to one embodiment, the display 160 may display the content (e.g., web page or the like) including the object (e.g., text or image) associated with the device control information. The display 160 may display an image of the first device according to device information included in the device control information.

The first communication interface 170 may set communication between the electronic device 101 and an external device (e.g., the first external electronic device 102, the second external electronic device 104, or the server 106). For example, the first communication interface 170 may be connected with a network 162 through wired or wireless communication so as to communicate with the external device (e.g., the second external electronic device 104 or the server 106).

According to one embodiment, the first communication interface 170 may receive the device control information from the web server (e.g., the server 106). The first communication interface 170 may transmit the first command extracted from the device control information to the first device. According to one embodiment, the first communication interface 170 may transmit the first command to the first device according to user input or when a preset time elapses.

When short-range communication between the electronic device 101 and the first device is impossible, the first communication interface 170 may request the external device (e.g., the server 106) connected with the first device to transmit the first command to the first device. To this end, the first communication interface 170 may transmit the request message generated by the first processor 120 to the external device.

The wireless communication may use at least one of, as a cellular communication protocol, long-term evolution (LTE), LTE advanced (LTE-A), code division multiple access (CDMA), wideband CDMA (WCDMA), universal mobile telecommunication system (UMTS), wireless broadband (WiBro), and global system for mobile communication (GSM). In addition, the wireless communication may include short-range communication 164. The short-range communication 164 may include at least one of wireless fidelity (Wi-Fi), Bluetooth, near field communication (NFC), and global navigation satellite system (GNSS). The GNSS may include at least one of a global positioning system (GPS), global navigation satellite system (GLONASS), Beidou navigation satellite system (hereinafter, referred to as "Beidou"), Galileo, and the European global satellite-based navigation system, depending on the bandwidth or area of usage. Herein, in the present document, "GPS" may be interchangeably used with "GNSS" below. The wired communication may include at least one of universal serial bus (USB), high definition multimedia interface (HDMI), recommended standard 232 (RS-232), and plain old telephone service (POTS). The network 162 may include at least one of a telecommunications network, e.g., a computer network (e.g., LAN or WAN), the Internet, and a telephone network.

Each of the first and second external electronic devices 102 and 104 may be of a kind that is the same or different from that of the electronic device 101. According to one embodiment, the server 106 may include a group of one or more servers. According to various embodiments, all or some of operations executed in the electronic device 101 may be executed in another electronic device or a plurality of other electronic devices (e.g., the electronic devices 102 and 104, or the server 106). According to one embodiment, when the electronic device 101 is required to perform any function or service automatically or in response to a request, the electronic device 101 may request at least a portion of the function associated with the function or the service from other devices (e.g., the electronic devices 102 and 104, or the server 106) additionally or in place of executing the function or the service by itself. The other electronic devices (e.g., the electronic devices 102 and 104, or the server 106) may execute the requested function or additional function and transmit the execution result to the electronic device 101. The electronic device 101 may process the received result as is or additionally, and provide the requested function or service. For this, for example, cloud-computing technology, distributed-computing technology, or client-server-computing technology may be used.

The electronic device for receiving content according to one embodiment of the present disclosure may include: a communication interface; and a processor configured to control to: receive content including at least one object from a web server, in response to the object being selected, acquire device information indicating at least one first device related to the object and device control information including a first command for operating the at least one first device, and control the communication interface to transmit the first command to the at least one first device.

Figure 2:
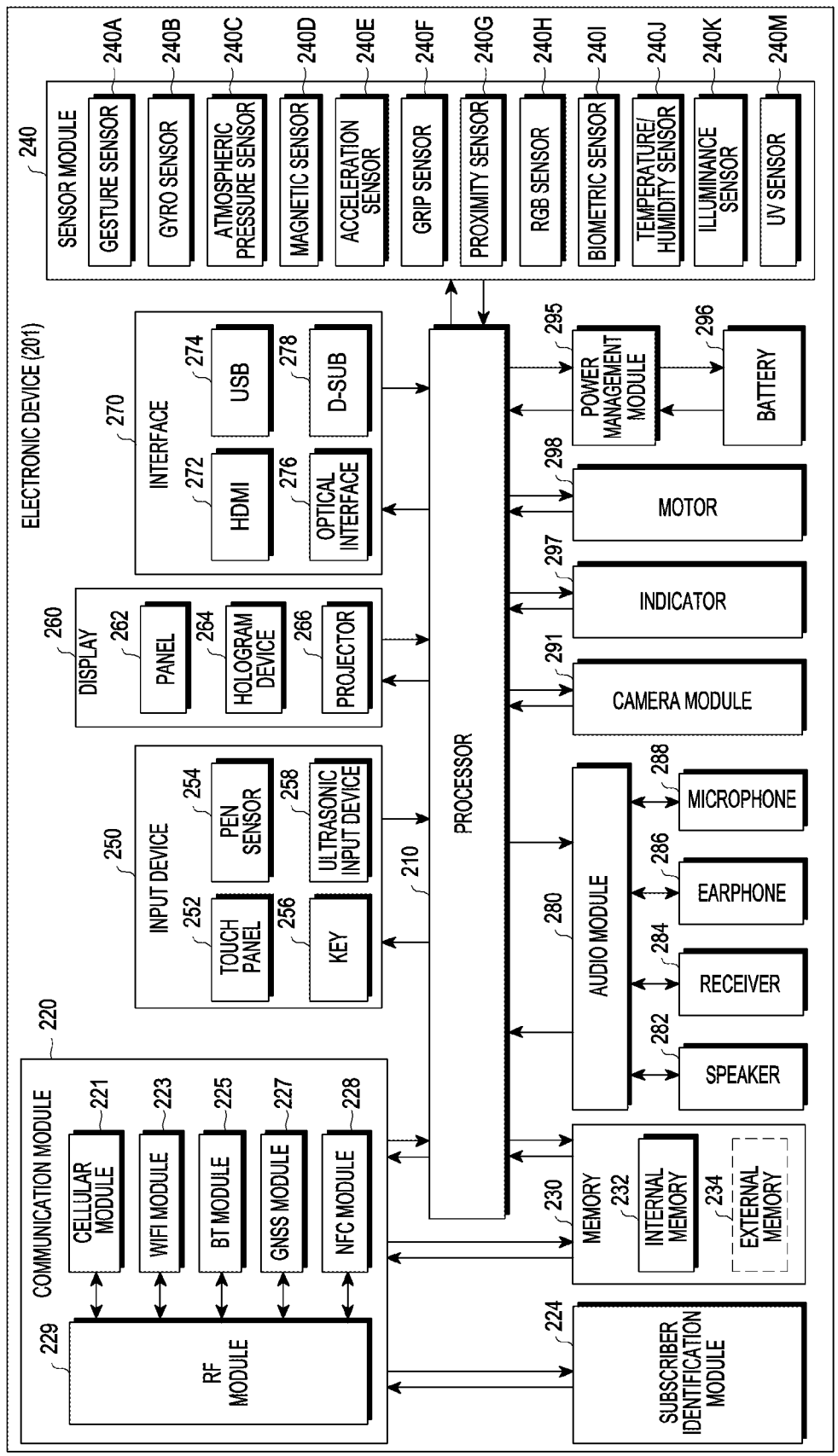
FIG. 2 is a block diagram illustrating an electronic device according to various embodiments.

FIG. 2 is a block diagram illustrating an electronic device according to various embodiments.

An electronic device 201 may include all or some the components of the electronic device 101 shown in FIG. 1. The electronic device 201 may include one or more processors (e.g., application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or an application program so as to control a plurality of hardware or software components connected thereto, and may also perform various data processing and arithmetic operations. The processor 210 may be implemented by, for example, a system-on-chip (SoC). According to one embodiment, the processor 210 may further include a graphic processing unit (GPU) and/or an image signal processor. The processor 210 may include at least some components (e.g., a cellular module 221) among the components illustrated in FIG. 2. The processor 210 may load a command or data received from at least one of the other components (e.g., non-volatile memory) in volatile memory to process the command and data, and may store various types of data in non-volatile memory.

The communication module 220 may have a configuration the same as or similar to that of the first communication interface 170 of FIG. 1. The communication module 220 may include, for example, a cellular module 221, a Wi-Fi module 223, a Bluetooth module 225, a GNSS module 227 (e.g., GPS module, GLONASS module, Beidou module, or Galileo module), an NFC module 228, and a radio-frequency (RF) module 229.

The cellular module 221 may provide, for example, a voice call, a video call, a message service, or an internet service through a communication network. According to one embodiment, the cellular module 221 may perform discrimination and authentication of the electronic device 201 within the communication network using the subscriber identification module (e.g., SIM card) 224. According to one embodiment, the cellular module 221 may perform at least some of the functions that may be provided by the processor 210. According to one embodiment, the cellular module 221 may include a communication processor (CP).

Each of the Wi-Fi module 223, the Bluetooth module 225, the GNSS module 227, and the NFC module 228 may include, for example, a processor to process data transmitted/received through a corresponding module. According to some embodiments, at least some (e.g., two or more) of the cellular module 221, the Wi-Fi module 223, the Bluetooth module 225, the GNSS module 227, and the NFC module 228 may be included in a single integrated chip (IC) or an IC package.

The RF module 229 may transmit or receive, for example, a communication signal (e.g., RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, and the NFC module 228 may transmit/receive an RF signal through one or more separate RF modules.

The subscriber identification module 224 may include, for example, a card that includes a subscriber identification module and/or an embedded SIM, and may also include intrinsic identification information (e.g., an integrated circuit card identifier (ICCID)) or subscriber information (e.g., an international mobile subscriber identity (IMSI)).

The memory 230 (e.g., the first memory 130) may include, for example, an internal memory 232 or an external memory 234. The internal memory 232 may include at least one of, for example, a volatile memory (e.g., dynamic RAM (DRAM), static RAM (SRAM), or synchronous DRAM (SDRAM)), and a non-volatile memory (e.g., one-time programmable ROM (OTPROM), programmable ROM (PROM), erasable and programmable ROM (EPROM), electrically erasable and programmable ROM (EEPROM), mask ROM, flash ROM, flash memory (e.g., NAND flash memory or NOR flash memory), a hard drive, or a solid-state drive (SSD)).

The external memory 234 may further include a flash drive, for example, compact flash (CF), secure digital (SD), micro secure digital (Micro-SD), mini secure digital (Mini-SD), extreme digital (xD), multi-media card (MMC), or memory stick. The external memory 234 may be functionally and/or physically connected to the electronic device 201 through any of various interfaces.

The sensor module 240 may measure a physical quantity or may sense an operating state of the electronic device 201, and may then convert the measured or sensed information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a biometric sensor 240I, a temperature/humidity sensor 240J, an illuminance sensor 240K, and an ultra-violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors incorporated therein. In some embodiments, the electronic device 201 may further include a processor configured to control the sensor module 240 as a part of the processor 210 or separate from the processor 210 so as to control the sensor module 240 while the processor 210 is in a sleep state.

The input device 250 may include, for example, a touch panel 252, a (digital) pen sensor 254, a key 256, or an ultrasonic input device 258. As the touch panel 252, at least one of, for example, a capacitive-type touch panel, a resistive-type touch panel, an infrared-type touch panel, and an ultrasonic-type touch panel may be used. In addition, the touch panel 252 may further include a control circuit. The touch panel 252 may further include a tactile layer so as to provide a tactile reaction to a user.

The (digital) pen sensor 254 may be, for example, a portion of the touch panel or may include a separate recognition sheet. The key 256 may include, for example, a physical button, an optical key, or a keypad. The ultrasonic input device 258 may sense, through a microphone (e.g., a microphone 288), ultrasonic waves that are generated by an input tool so as to confirm data corresponding to the sensed ultrasonic waves.

The display 260 (e.g., the display 160) may include a panel 262, a hologram device 264, or a projector 266. The panel 262 may have a configuration the same as or similar to that of the display 160 of FIG. 1. The panel 262 may be implemented to be flexible, transparent, or wearable. The panel 262 may be configured as a single module with the touch panel 252. The hologram device 264 may show a stereoscopic image in the air using light interference. The projector 266 may project light onto a screen so as to display an image. The screen may be located, for example, inside or outside the electronic device 201. According to one embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) interface 278. The interface 270 may be included, for example, in the first communication interface 170 shown in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bi-directionally convert, for example, sound and electric signals. At least some components of the audio module 280 may be included, for example, in the input/output interface 150 shown in FIG. 1. The audio module 280 may process sound information input or output through, for example, a speaker 282, a receiver 284, an earphone 286, or a microphone 288.

The camera module 291 is a device that is capable of photographing, for example, a still image and a moving image. According to one embodiment, the camera module 291 may include one or more image sensors (e.g., a front sensor or a rear sensor), a lens, an image signal processor (ISP), or a flash (e.g., LED or xenon lamp).

The power management module 295 may manage, for example, the electric power of the electronic device 201. According to one embodiment, the power management module 295 may include a power management integrated circuit (PMIC), a charger integrated circuit (IC), or a battery or fuel gauge. The PMIC may be configured in a wired and/or wireless charge type. The wireless charge type may include, for example, a magnetic-resonance type, a magnetic-induction type, or an electromagnetic-wave type, and may further include an additional circuit for wireless charging, for example, a coil loop, a resonance circuit, or a rectifier. The battery gauge may measure the remaining charge of the battery 296, and a voltage, a current, or a temperature during charging. The battery 296 may include, for example, a rechargeable battery and/or a solar battery.

The indicator 297 may indicate the specific state of the electronic device 201 or of a part thereof (e.g., the processor 210), for example, a booting state, a message state, or a charged state. The motor 298 may convert an electric signal into a mechanical vibration, and may generate a vibration or a haptic effect. Although not illustrated, the electronic device 201 may include a processor (e.g., GPU) to support a mobile TV. The processor to support a mobile TV may process media data according to the standards of, for example, Digital Multimedia Broadcasting (DMB), Digital Video Broadcasting (DVB), or MediaFLO™.

Each of the above-described component elements of hardware according to the present disclosure may be configured with one or more components, and the names of the corresponding component elements may vary based on the type of electronic device. In various embodiments of the present disclosure, the electronic device may include at least one of the above-described elements, and may exclude some of the elements or further include other additional elements. Further, some of the components of the electronic device according to the various embodiments of the present disclosure may be combined to form a single entity, and thus, may equivalently execute functions of the corresponding elements prior to the combination.

Figure 3:
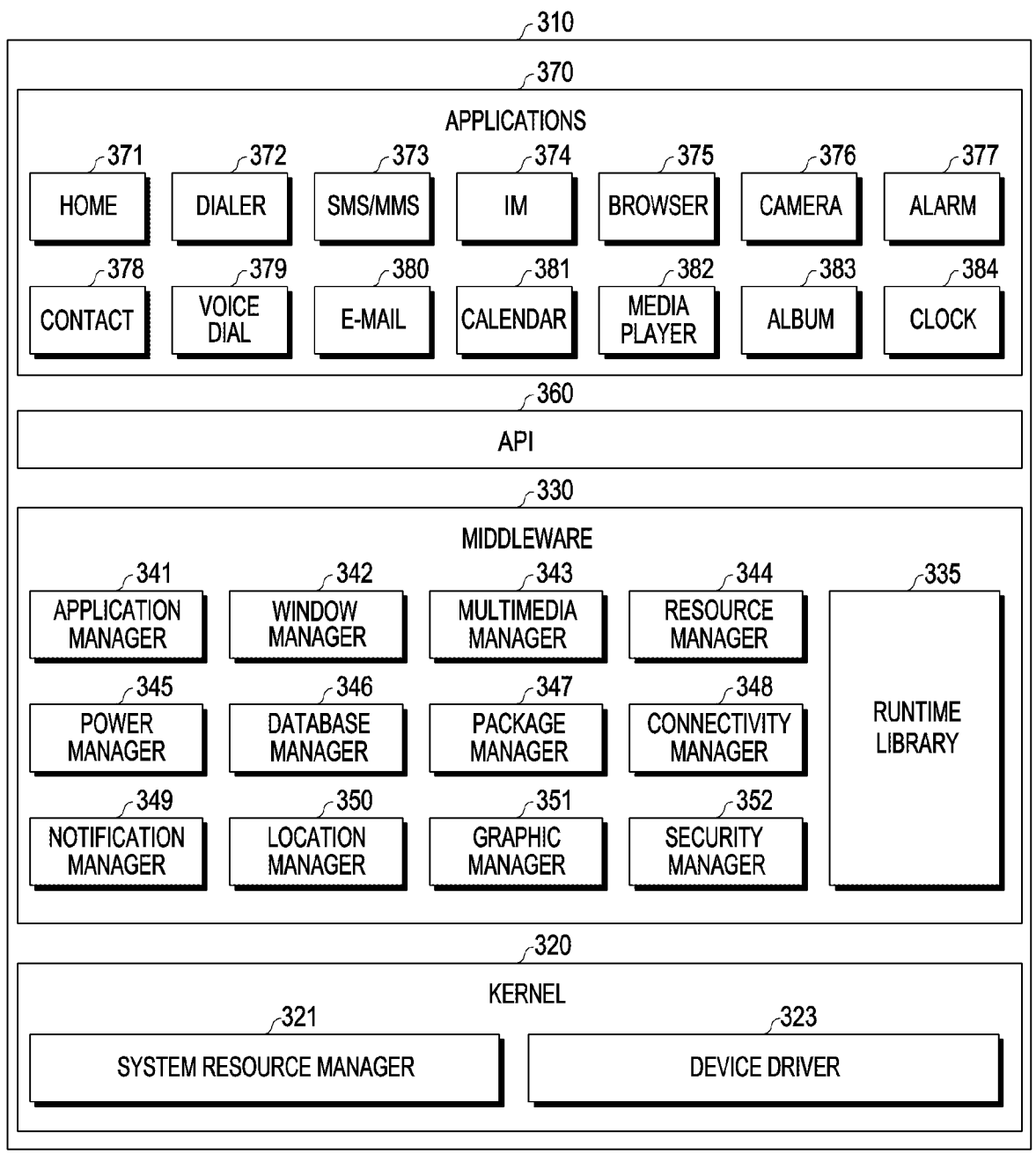
FIG. 3 is a block diagram illustrating a program module according to various embodiments.

FIG. 3 is a block diagram illustrating a program module according to various embodiments.

According to one embodiment, a program module 310 (e.g., the program 140) may include an OS for controlling resources associated with an electronic device (e.g., the electronic device 101) and/or various applications (e.g., the applications 147) running on the OS. The OS may be, for example, Android™, iOS™, Windows™ Symbian™, Tizen™, Bada™, etc.

The program module 310 may include a kernel 320, middleware 330, an API 360, and/or applications 370. At least part of the program module 310 may be preloaded on the electronic device or downloaded from an external electronic device (e.g., the electronic device 102 or 104, or a server 106).

The kernel 320 (e.g., the kernel 141) may include a system resource manager 321 and/or a device driver 323. The system resource manager 321 may perform control, allocation, or recovery of system resources. According to one embodiment, the system resource manager 321 may include a process manager, a memory manager, or a file-system manager. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so that the applications 370 may efficiently use the limited system resources within the electronic device. According to one embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a complier to add a new function through a programming language while the applications 370 are executed. The runtime library 335 may perform input/output control, memory control, functions associated with an arithmetic function, and the like.

The application manager 341 may manage the life cycle of at least one of the applications 370. The window manager 342 may manage GUI resources used on the screen. The multimedia manager 343 may identify a format required for reproducing various media files and perform encoding or decoding of a media file using a codec suitable for the corresponding format. The resource manager 344 may manage resources such as a source code, memory, or storage space for at least one of the applications 370.

The power manager 345 may operate together with a basic input/output system (BIOS) to manage a battery or power and may provide power information required for operation of the electronic device. The database manager 346 may generate, search, and change a database to be used by at least one of the applications 370. The package manager 347 may manage the installation or update of an application distributed in the form of a package file.

The connectivity manager 348 may manage, for example, a wireless connection such as Wi-Fi or BT. The notification manager 349 may display or notify a user of an event such as an arrival message, an appointment, a proximity alarm or the like in a manner that does not disturb the user. The location manager 350 may manage location information of the electronic device. The graphic manager 351 may manage a graphic effect provided to the user or a user interface related to the graphic effect. The security manager 352 may provide a general security function required for system security or user authentication. According to one embodiment, when an electronic device (e.g., the electronic device 101) has a call function, the middleware 330 may further include a telephony manager for managing a voice call function or a video call function of the electronic device.

The middleware 330 may include a middleware module that performs a combination of various functions of the above-described components. The middleware 330 may provide a module specialized for each type of OSs to provide distinct functions. The middleware 330 may also dynamically delete some existing components or add new components.

The API 360 (e.g., the API 145) may be a set of API programming functions, and may be provided with a different configuration depending on the OS. For example, in Android™ or iOS™, a single API set may be provided for each platform. In Tizen™, two or more API sets may be provided for each platform 70.

The applications 370 (e.g., the applications 147) may include one or more applications for performing various functions, e.g., a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an email application 380, a calendar application 381, a media player application 382, an album application 383, a clock application 384, a health care application (e.g., an application for measuring an amount of exercise, a blood sugar level, etc.), and an environment information application (e.g., an application for providing atmospheric pressure, humidity, temperature, etc.).

According to one embodiment, the applications 370 may include an application (hereinafter, for convenience of description, referred to as "information exchange application") for supporting information exchange between an electronic device (e.g., the electronic device 101) and an external electronic device (e.g., the electronic devices 102 or 104). The information exchange application may include a notification relay application for relaying specific information to the external electronic device or a device management application for managing the external electronic device.

For example, the notification relay application may have a function of notifying an external electronic device (e.g., the electronic devices 102 or 104) of notification information generated by other applications (e.g., an SMS/MMS application, email application, health care application, or environment information application) of the electronic device. In addition, the notification relay application may receive notification information from the external electronic device and may provide the received notification information to a user.

The device management application may manage (e.g., install, delete, or update) at least one of the functions of the external electronic device (e.g., the electronic device 102 or 104) communicating with the electronic device (e.g., turning on/off of the external electronic device (or some of the components of the external electronic device) or brightness (or resolution) adjustment of the display), the applications running on the external electronic device, or the services provided by the external electronic device (e.g., telephony service or messaging service).

According to one embodiment, the applications 370 may include an application (e.g., a health care application of a mobile medical device) designated according to the attributes of the external electronic device (e.g., the electronic device 102 or 104). According to one embodiment, the applications 370 may include an application received from the external electronic device (e.g., the server 106, or the electronic device 102 or 104). According to one embodiment, the applications 370 may include a preloaded application or a third-party application downloadable from a server. The names of the components of the program module 310 according to the shown embodiment may be changed depending on the OS.

According to various embodiments, at least part of the program module 310 may be implemented in one of software, firmware, and hardware, or a combination of at least two thereof. For example, the at least part of the program module 310 may be implemented (e.g., executed) by a processor (e.g., the processor 210). The at least part of the program module 310 may include sets of modules, programs, routines, instructions or processes for executing at least one function.

Figure 4:
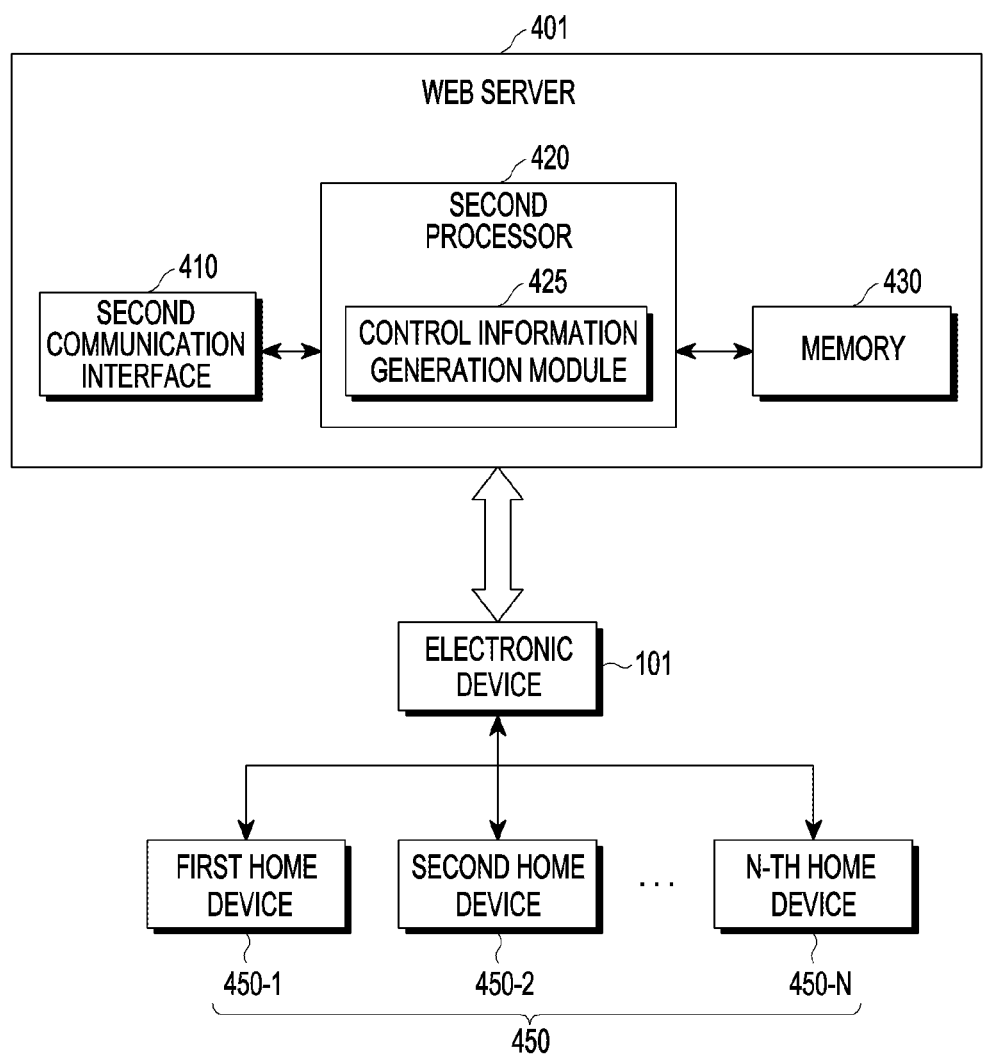
FIG. 4 is a diagram illustrating another example of a network environment including an electronic device according to various embodiments.

FIG. 4 is a diagram illustrating another example of a network environment including an electronic device according to various embodiments.

Referring to FIG. 4, the electronic device 101 may be connected to each of a web server 401 (e.g., the server 106) and home devices 450. According to one embodiment, the electronic device 101 may be connected to the home devices 450 via short-range communication.

Referring to FIG. 4, the web server 401 may include at least one of a second communication interface 410, a second processor 420, and a second memory 430.

The second communication interface 410 may perform a function of communication with the web server 401. The second communication interface 410 may establish communication between the web server 401 and the electronic device 101. For example, the second communication interface 410 may communicate with the electronic device 101 via wireless or wired communication. According to one embodiment, the second communication interface 410 may transmit at least one object and a web page containing device control information associated with the at least one object as content to the electronic device 101 in response to a request of the electronic device 101.

The second processor 420 may control all operations of the web server 401. According to one embodiment, the second processor 420 may generate content provided to the electronic device 101, for example, at least one object (e.g., images, text, etc.) and a web page containing device control information associated with the at least one object. The second processor 420 may be implemented in a form including a control information generation module 425. The control information generation module 425 may generate the device control information associated with the object included in the web page. The control information generation module 425 may generate the device control information in the form of a uniform resource locator (URL), and the device control information may be stored in a second memory 430.

The second memory 430 may include volatile and/or non-volatile memory. The second memory 230 may store commands or data associated with at least one other component of the web server 401. According to one embodiment, the second memory 430 may store the at least one object, the device control information associated with the object, the web page, and the like.

The electronic device 101 may be connected to home devices 450, that is, each of a first home device 450-1, a second home device 450-2, ..., and an N-th home device 450-N via a short-range communication method. When receiving the device control information from the web server 401, the electronic device 101 may acquire (or extract) device information and commands from the device control information. The electronic device 101 may determine the home device corresponding to the device information among the home devices 450. For example, when the second home device 450-2 corresponds to the device information, the electronic device (101) may transmit the command acquired from the device control information to the second home device 450-2.

A server providing content according to one embodiment of the present disclosure may include: a communication interface; and a processor configured to control to: provide, to an electronic device, a web page including an object including at least one command for controlling the operation of at least one first device, and associate device information indicating the at least one first device and device control information including a first command for operating the at least one first device, with the object, and control the communication interface to transmit the first command to the electronic device.

Figure 5:
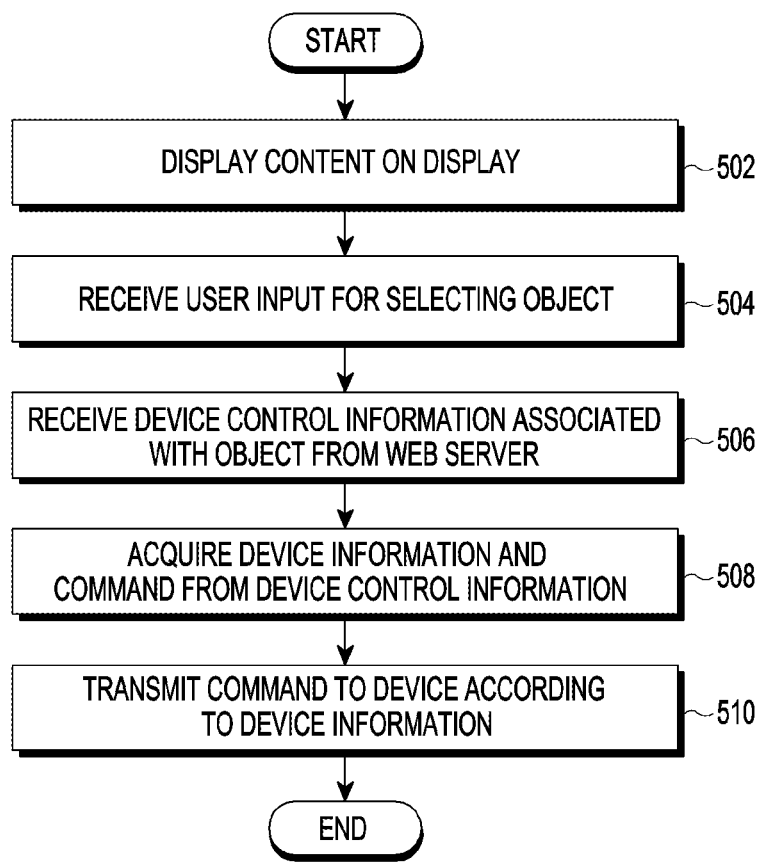
FIG. 5 is a flowchart illustrating an example of a method in which an electronic device according to various embodiments receives content.

FIG. 5 is a flowchart illustrating an example of a method in which an electronic device according to various embodiments receives content.

Referring to FIG. 5, in operation 502, content provided by the web server 401, for example, a web page, may be displayed on the display 160 of the electronic device 101.

In operation 504, the electronic device 101 may receive user input for selecting an object (e.g., image, text, or the like) included in the content. In operation 506, the electronic device 101 may receive device control information associated with the object from the web server 401. According to one embodiment, the device control information may be implemented in the form of a URL.

In operation 508, the first processor 120 of the electronic device 101 may acquire (or extract) device information and a command for controlling the corresponding device from the device control information. The device information may include information (e.g., a product name, etc.) about a device to execute the command, and the first processor 120 may determine the device to which the command is to be transmitted based on the device information. In operation 510, the electronic device 101 may transmit the command to the device corresponding to the device information.

In accordance with an aspect of the present disclosure, a method for receiving content at an electronic device may include: receiving content including at least one object from a web server; in response to the object being selected, acquiring, from the object, device information indicating at least one first device related the object and device control information including a first command for operating the at least one first device; and transmitting the first command to the at least one first device.

Figure 6:
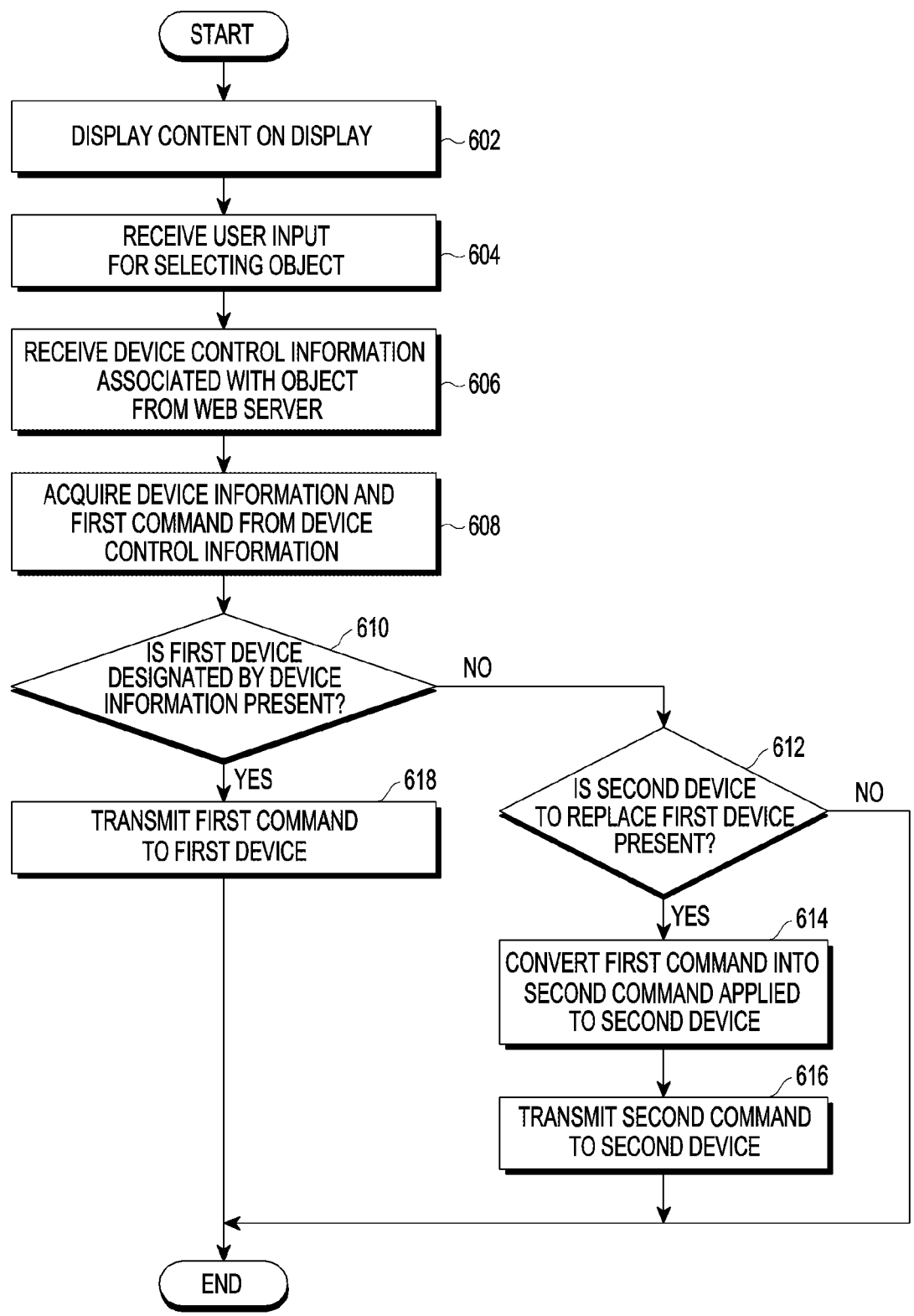
FIG. 6 is a flowchart illustrating another example of a method in which an electronic device according to various embodiments receives content.

FIG. 6 is a flowchart illustrating another example of a method in which an electronic device according to various embodiments receives content.

Referring to FIG. 6, in operation 602, content provided by the web server 401, for example, a web page, may be displayed on the display 160 of the electronic device 101. In operation 604, the electronic device 101 may receive user input for selecting an object (e.g., image, text, or the like) included in the content. In operation 606, the electronic device 101 may receive device control information associated with the object from the web server 401. According to one embodiment, the device control information may be implemented in the form of a URL.

In operation 608, the first processor 120 of the electronic device 101 may acquire (or extract) device information and a first command for controlling the corresponding device from the device control information. The device information may include information (e.g., a product name, etc.) about a first device to execute the first command. In operation 608, the first processor 120 may determine the first device to which the first command is to be transmitted based on the device information.

In operation 610, the first processor 120 may determine whether the first device designated by the device information is present. In operation 610, the first processor 120 may determine whether the first device is present based on a first list stored in the first memory 130 (or whether the electronic device 101 is connected to the first device via short-range communication). The first processor 120 may determine that the first device is present (or that the electronic device 101 is connected to the first device via short-range communication) if the first device is registered in the first list, and may determine that the first device is absent if the first device is not registered in the first list.

When the first device is determined to be absent based on the determination result of operation 610 (or when the electronic device 101 is not connected to the first device via short-range communication) (610: NO), the first processor 120 may determine whether a second device to replace the first device is present in operation 612. As in operation 610, the first processor 120 may determine whether the second device is present based on the first list stored in the first memory 130 (or whether the electronic device 101 is connected to the second device via short-range communication).

If the second device is determined to be absent based on the determination result of operation 612 (or if the electronic device 101 is not connected to the second device via short-range communication) (612: NO), the first processor 120 may maintain the current state without performing any other operations. If the second device is determined to be present based on the determination result of operation 612 (or if the electronic device 101 is connected to the second device via short-range communication) (612: YES), the first processor 120 may convert the first command into a second command that can be applied to the second device in operation 614.

For example, it is assumed that the first device is an oven and that the first command is to operate the oven for 5 minutes. It is also assumed that the second device capable of replacing the oven is a microwave oven. The first processor 120 may convert the first command into a second command that can be applied to the microwave oven, which is the second device. For example, the first command, to operate the oven for 5 minutes, may be converted into the second command, to operate the microwave oven for 10 minutes. In operation 616, the first communication interface 170 of the electronic device 101 may transmit the second command to the second device.

If the first device designated by the device information is determined to be present based on the determination result of operation 610 (or if the electronic device 101 is connected to the first device via short-range communication) (610: YES), the first communication interface 170 of the electronic device 101 may transmit the first command to the first device in operation 618.

Figure 7:
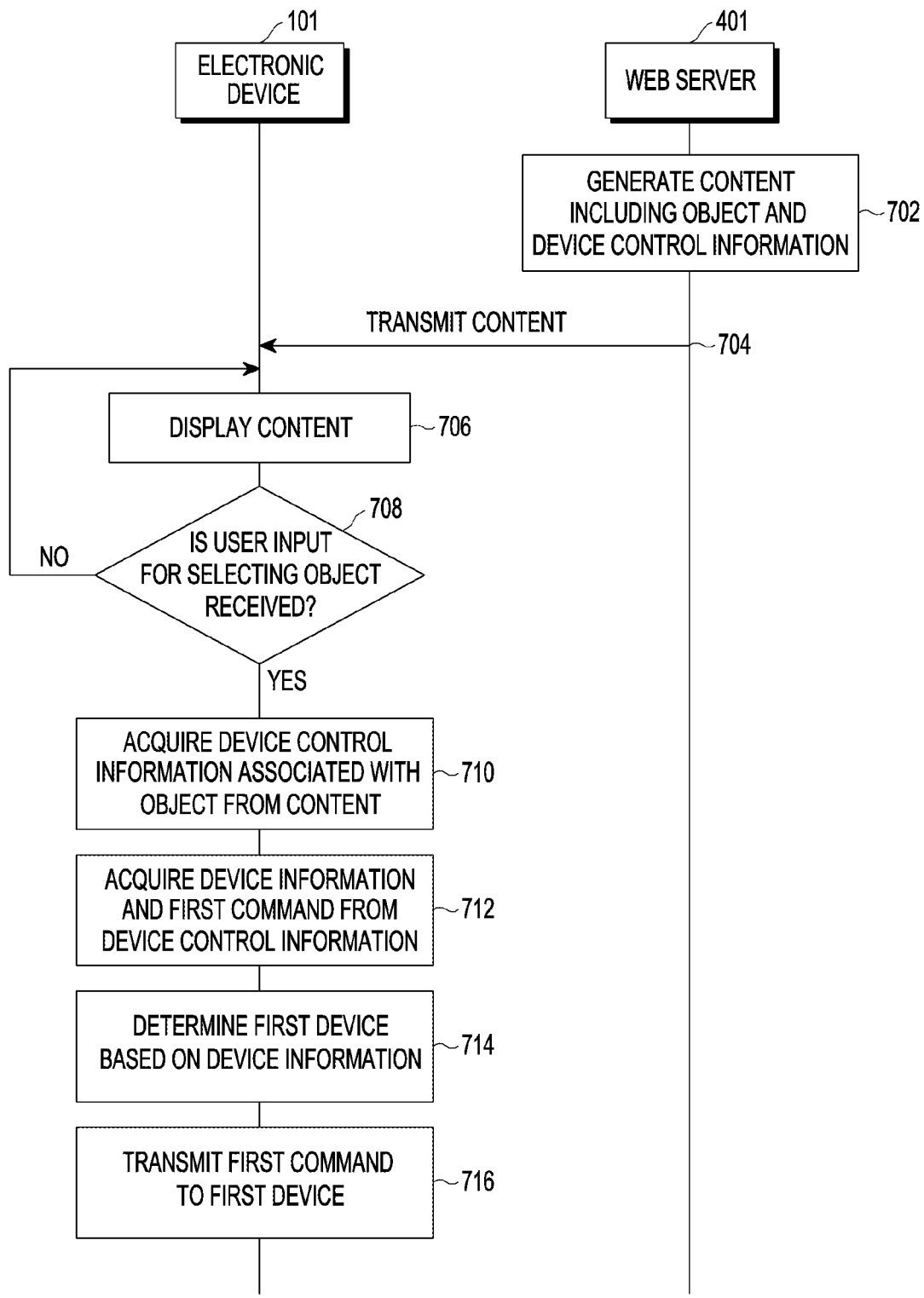
FIG. 7 is a flowchart illustrating still another example of a method in which an electronic device according to various embodiments receives content.

FIG. 7 is a flowchart illustrating still another example of a method in which an electronic device according to various embodiments receives content.

Referring to FIG. 7, in operation 702, the second processor 420 of the web server 401 may generate content including an object (e.g., image, text, or the like) and device control information. In operation 704, the second communication interface 430 of the web server 401 may transmit the content to the electronic device 101.

In operation 706, the content provided by the web server 401, for example, a web page, may be displayed on the display 160 of the electronic device 101. In operation 708, the electronic device 101 may determine whether user input for selecting the object (e.g., image, text, or the like) included in the content is received. If user input for selecting the object is not received based on the determination result of operation 708 (708: NO), the first processor 120 may maintain a current state displaying the content without performing any other operations in operation 706.

If user input for selecting the object is received based on the determination result of operation 708 (708: YES), the first processor 120 of the electronic device 101 may acquire device control information associated with the object in operation 710. Since the content including the device control information is transmitted from the web server 401 to the electronic device 101 in operation 704, the first processor 120 may acquire (or extract) the device control information associated with the object from the content in operation 710.

In operation 712, the first processor 120 of the electronic device 101 may acquire (or extract) device information and a first command for controlling the corresponding device from the device control information. The device information may include information about a first device to execute the first command. In operation 714, the first processor 120 may determine the first device to which the first command is to be transmitted based on the device information. In operation 716, the electronic device 101 may transmit the first command to the first device.

In accordance with still an aspect of the present disclosure, a method for providing content at a server may include: providing, to an electronic device, a web page including an object including at least one command for controlling the operation of at least one first device; and associating device information indicating the at least one first device and device control information including a first command for operating the at least one first device, with the object, and transmitting the first command to the electronic.

Figure 8:
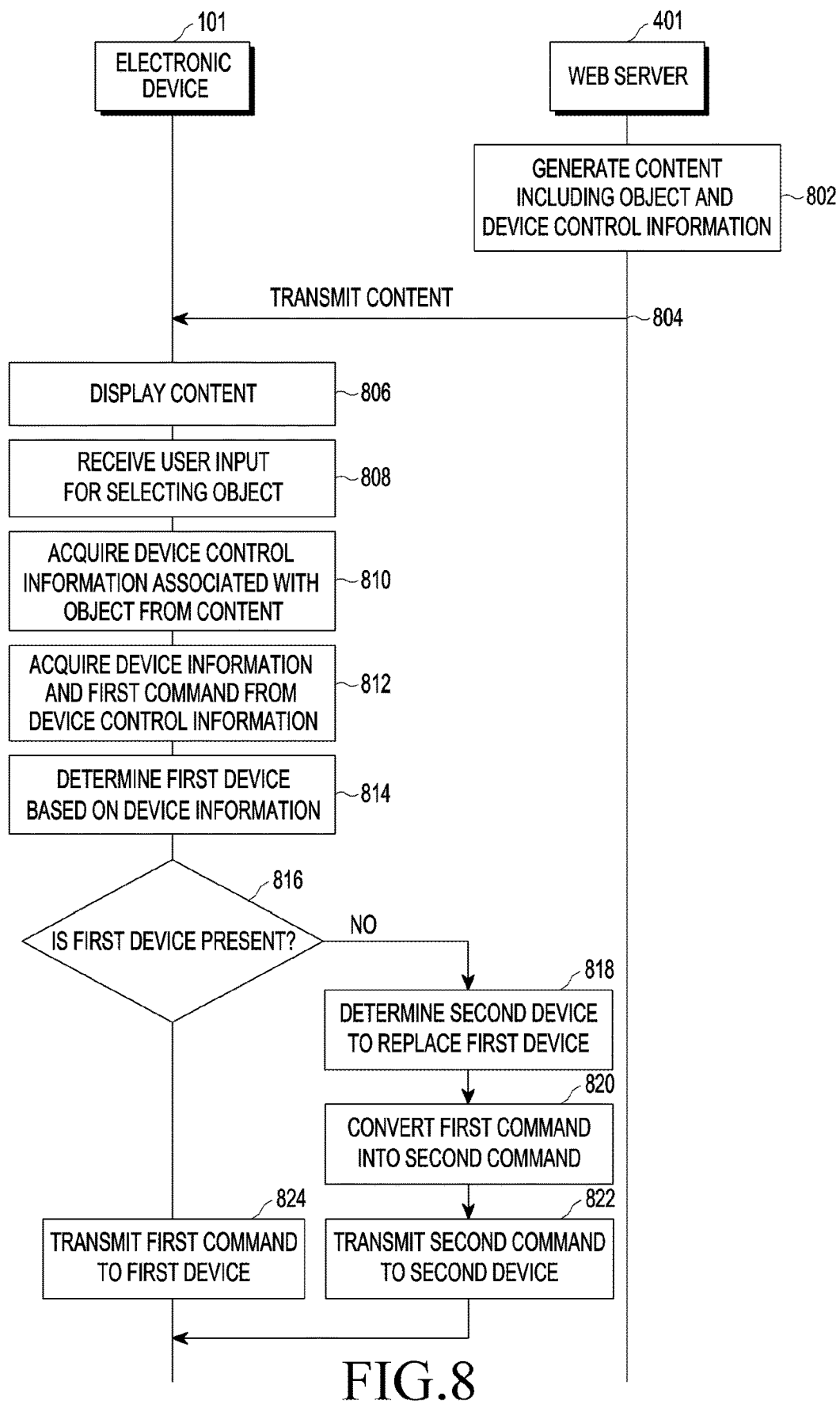
FIG. 8 is a flowchart illustrating yet another example of a method in which an electronic device according to various embodiments receives content.

FIG. 8 is a flowchart illustrating yet another example of a method in which an electronic device according to various embodiments receives content.

Referring to FIG. 8, in operation 802, the second processor 420 of the web server 401 may generate content including an object (e.g., image, text, or the like) and device control information. In operation 804, the second communication interface 430 of the web server 401 may transmit the content to the electronic device 101.

In operation 806, the content provided by the web server 401, for example, a web page, may be displayed on the display 160 of the electronic device 101. In operation 808, the electronic device 101 may receive user input for selecting the object (e.g., image, text, or the like) included in the content. The user input may be received via the input/output interface 150 or the display 160.

In operation 810, the first processor 120 of the electronic device 101 may acquire device control information associated with the object from the content. According to one embodiment, the first processor 120 may extract the device control information from the content (e.g., web page) in operation 810. The device control information may be implemented in the form of a URL, and may be information linked to the object.

In operation 812, the first processor 120 of the electronic device 101 may acquire (or extract) device information about a first device and a first command for controlling the first device from the device control information. The device information may include information about the first device to execute the first command. In operation 814, the first processor 120 may determine the first device to which the first command is to be transmitted based on the device information.

In operation 816, the first processor 120 of the electronic device 101 may determine whether the first device is present. When the first device is determined to be absent based on the determination result of operation 816 (816: NO), the first processor 120 may determine a second device to replace the first device in operation 818. If the second device is determined, the first processor 120 of the electronic device 101 may convert the first command to a second command that can be applied to the second device in operation 820. In operation 822, the communication interface of the electronic device 101 may transmit the second command to the second device.

If the first device is determined to be present based on the determination result of operation 816 (816: YES), the first communication interface 170 of the electronic device 101 may transmit the first command to the first device in operation 824.

Figure 9:
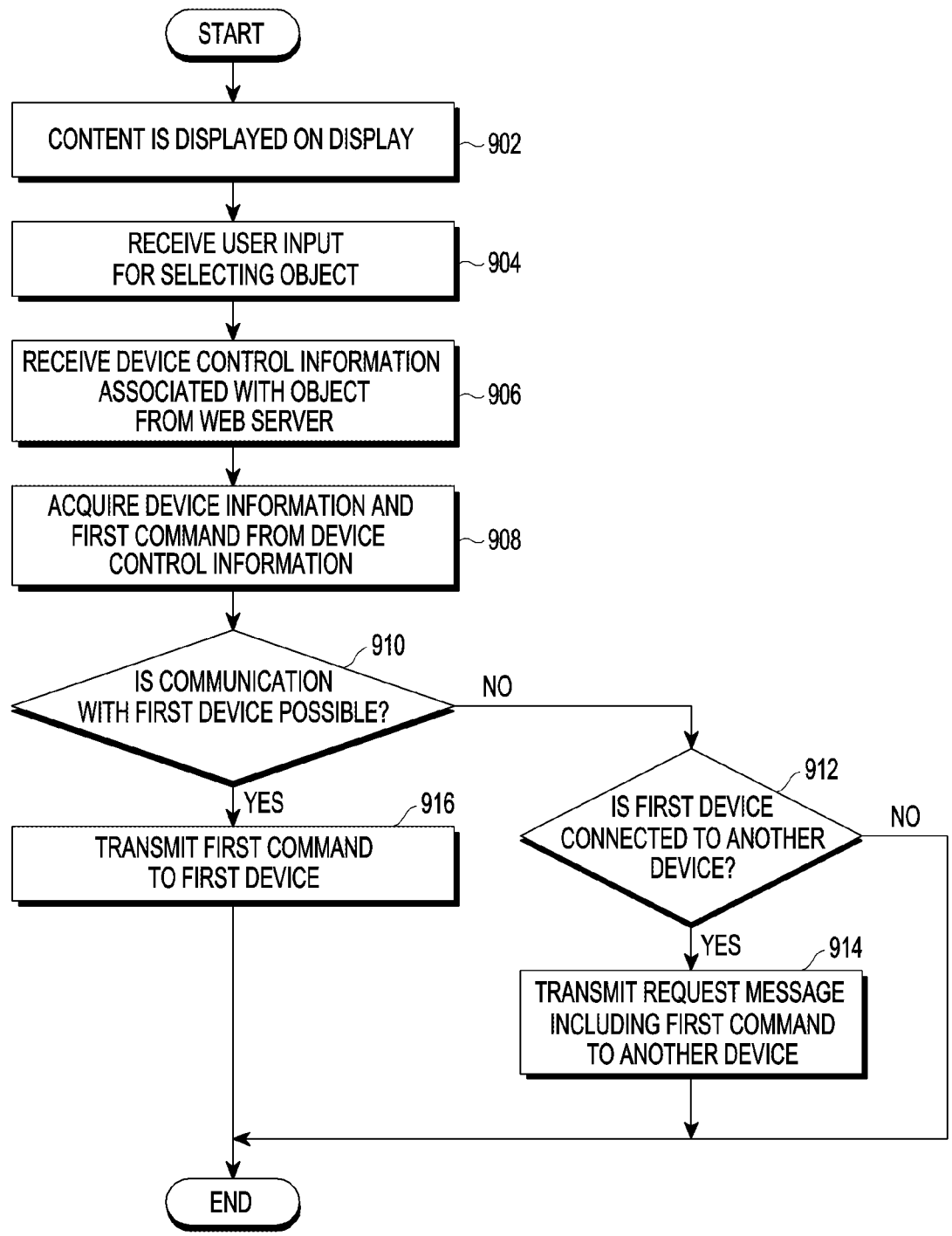
FIG. 9 is a flowchart illustrating a further example of a method in which an electronic device according to various embodiments receives content.

FIG. 9 is a flowchart illustrating a further example of a method in which an electronic device according to various embodiments receives content.

Referring to FIG. 9, in operation 902, content provided by the web server 401, for example, a web page, may be displayed on the display 160 of the electronic device 101. In operation 904, the electronic device 101 may receive user input for selecting an object (e.g., an image, text, or the like) included in the content. In operation 906, the electronic device 101 may receive device control information associated with the object from the web server 401. According to one embodiment, the device control information may be implemented in the form of a URL.

In operation 908, the first processor 120 of the electronic device 101 may acquire (or extract) device information and a first command for controlling the corresponding device from the device control information. The device information may include information about a first device to execute the first command. In operation 908, the first processor 120 may determine the first device to which the first command is to be transmitted based on the device information.

In operation 910, the first processor 120 may determine whether communication between the electronic device 101 and the first device designated by the device information is possible. For example, the first processor 120 may determine whether communication between the electronic device 101 and the first device is possible based on a first list or a second list stored in the first memory 130. If the first device is registered in the first list, the first processor 120 may determine that communication between the electronic device 101 and the first device is possible. If the first device is not registered in the first list but is registered in the second list, the first processor 120 may determine that communication between the electronic device 101 and the first device is impossible.

If communication between the electronic device 101 and the first device is determined to be impossible based on the determination result of operation 910 (910: NO), the electronic device 101 may transmit a request message including the first command to another device (e.g., a home server or the like) connected to the first device. In operation 912, the first processor 120 of the electronic device 101 may determine whether the first device is connected to another device. If the first device is connected to the other device based on the determination result of operation 912 (912: YES), the first processor 120 of the electronic device 101 may generate the request message to request that the first command is transmitted to the first device in operation 914. The first communication interface 170 may transmit the request message generated by the first processor 120 to the other device (e.g., a home server, or the like) connected to the first device.

If communication between the electronic device 101 and the first device designated by the device information is possible based on the determination result of operation 910 (910: YES), the first communication interface 170 of the electronic device 101 may transmit the first command to the first device in operation 916.

Figure 10:
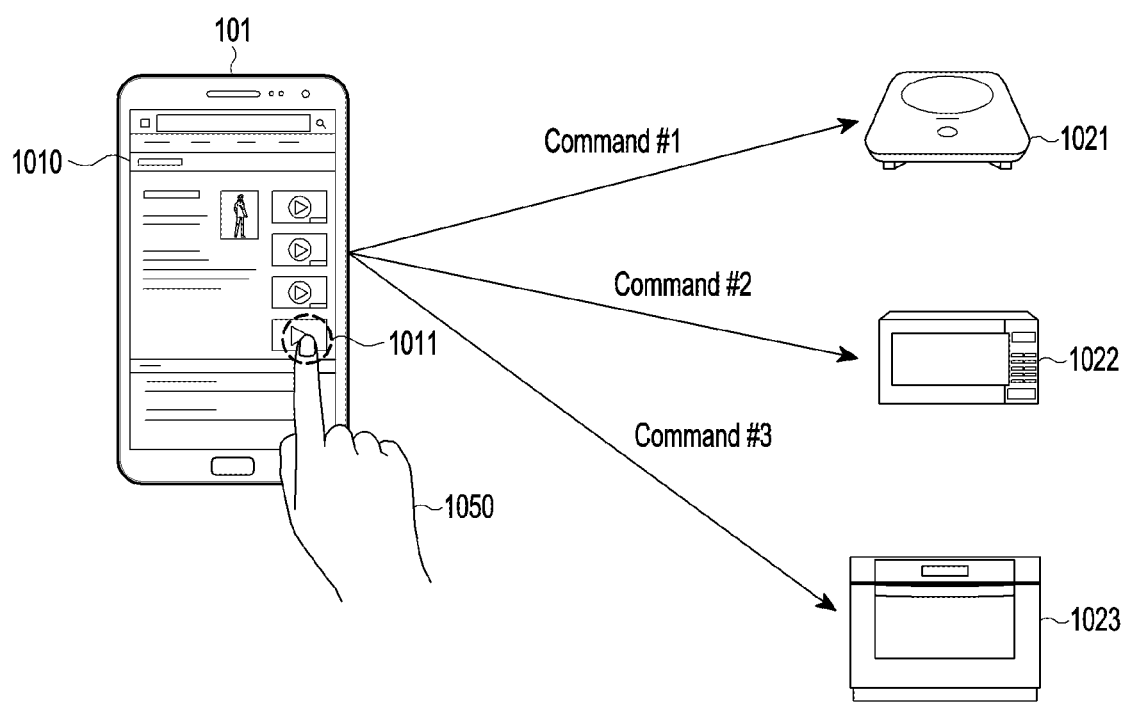
FIG. 10 is a diagram illustrating an example in which an electronic device according to various embodiments receives content.

FIG. 10 is a diagram illustrating an example in which an electronic device according to various embodiments receives content.

Referring to FIG. 10, a web page 1010 including a plurality of objects (e.g., images, text, etc.) as content may be displayed in the electronic device 101. It is assumed that a user 1050 selects one object 1011 from the web page 1010. The electronic device 101 may receive device control information associated with the object 1011 from a web server (e.g., the web server 401) providing the web page 1010.

The electronic device 101 may be connected to first to third devices 1021, 1022, and 1023. It is assumed that the first device 1021 is a home induction, the second device 1022 is a microwave oven, and the third device 1023 is a smart oven. The device control information may include device information indicating at least one of the first to third devices 1021, 1022, and 1023 and commands to be transmitted to the at least one of the first to third devices 1021, 1022, and 1023.

For example, the device control information including the device information about the first device 1021 may be 'thingsweb://home_induction/cook?duration1=10&power1=9&duration2=5&power2=5'. The electronic device 101 may acquire (or extract) device information (home_induction) and a command (duration1=10&power1=9&duration2=5&power2=5) for operating the first device 1021 from the device control information. The electronic device 101 may transmit a command (Command #1) for operating the home induction, which is the first device 1021, for 10 minutes with intensity 9 and for 2 minutes with intensity 5 to the home induction based on the acquisition result.

For example, the device control information including the device information about the second device 1022 may be 'thingsweb://home_microwaveoven/cook?duration1=10&power1=4'. The electronic device 101 may acquire (or extract) device information (home_microwaveoven) and a command (duration1=10&power1=4) for operating the second device 1022 from the device control information. The electronic device 101 may transmit a command (Command #2) for operating the microwave oven, which is the second device 1022, for 10 minutes with intensity 4 to the microwave oven based on the acquisition result.

For example, the device control information including the device information about the third device 1023 may be 'thingsweb://home_smartoven/cook?duration1=10&power1=10'. The electronic device 101 may acquire (or extract) device information (home_smartoven) and a command (duration1=10&power1=10) for operating the third device 1023 from the device control information. The electronic device 101 may transmit a command (Command #1) for operating the smart oven, which is the third device 1023, for 10 minutes with intensity 10 to the smart oven based on the acquisition result.

According to another embodiment, the device control information may include device information about a plurality of devices and commands to be transmitted to the respective plurality of devices. For example, the device control information may include device information about the first device 1021 and the third device 1023 and commands to be transmitted to the first device 1021 and the third device 1023. For example, the electronic device 101 may receive device control information about the object 1011, such as 'thingsweb://home_induction/cook?duration1=10&power1=9&duration2=5&power2=5/home_smartoven/cook? duration1=10&power1=10', from the web server (e.g., the web server 401). The electronic device 101 may identify that the device control information is for the first device 1021, which is the home induction, and the third device 1023, which is the smart oven, and may then transmit the commands (Command #1 and Command #3) corresponding to the devices 1021 and 1023 to the first device 1021 and the third device 1023, respectively.

Figure 11A:
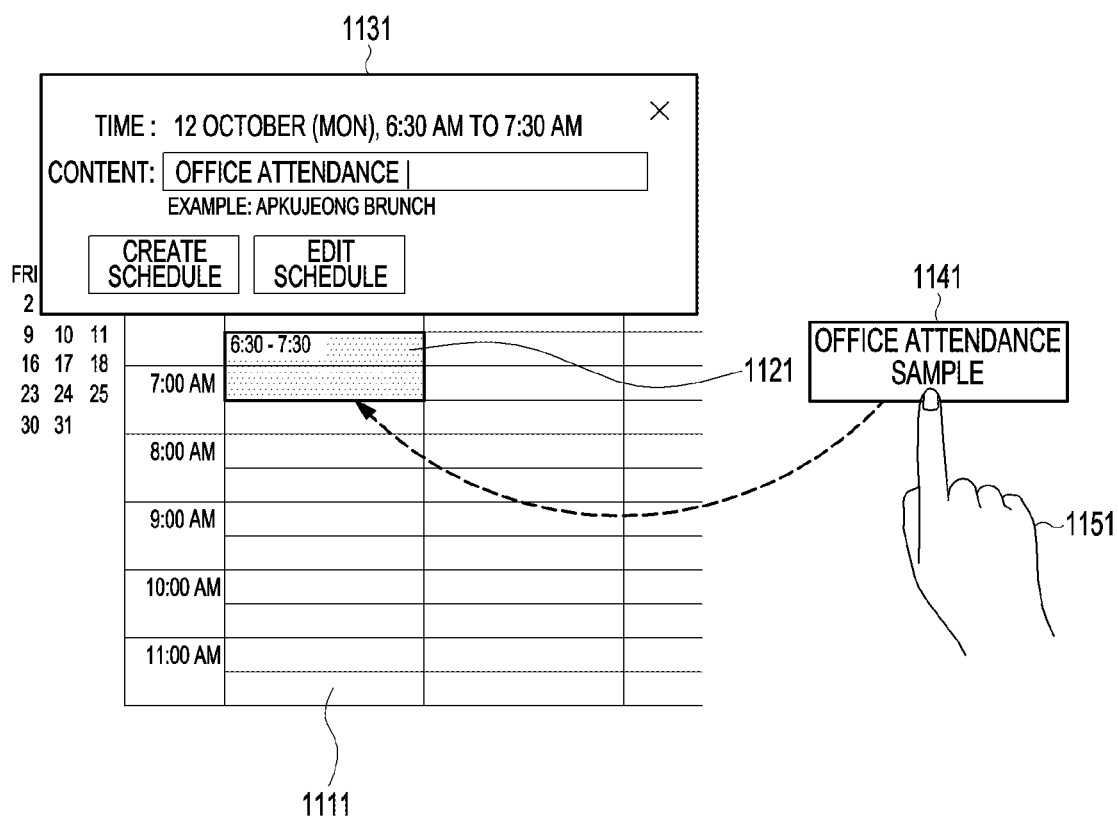
FIGS. 11A and 11B are diagrams illustrating an example in which an electronic device according to various embodiments provides content to a user.
Figure 11B:
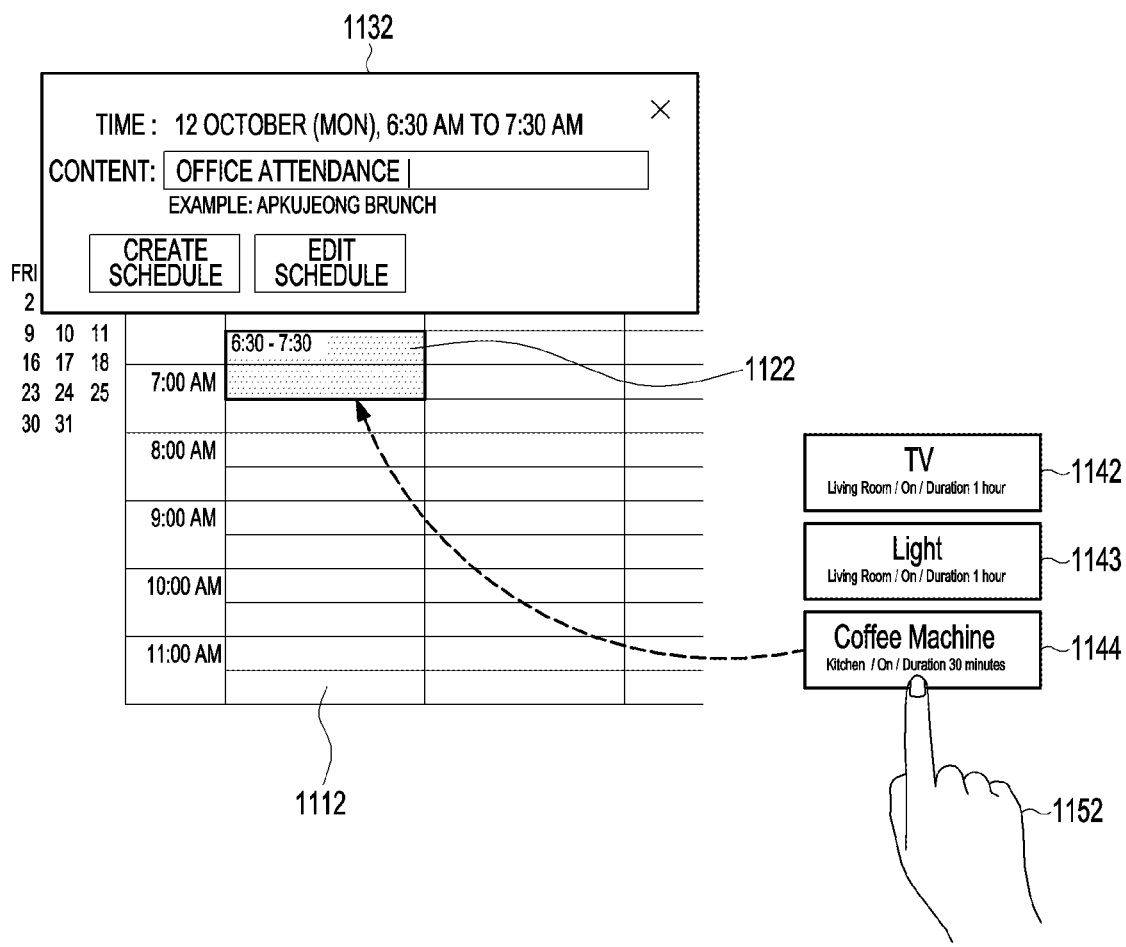

FIGS. 11A and 11B are diagrams illustrating an example in which an electronic device according to various embodiments provides content to a user.

Referring to FIG. 11A, the electronic device 101 may perform scheduling for the control of devices using the electronic device 101 according to user input from a user 1151. At this time, the user 1151 may schedule the devices by adding a web page 1010 as shown in FIG. 10 or schedule samples stored in advance in the first memory 130 of the electronic device 101 to a schedule table 1111 displayed on the display 160 of the electronic device 101. In FIG. 11A, the user 1151 may determine schedules of the devices from 6:30 am to 7:30 am by adding the web page 1010 or an office attendance sample 1141 among the schedule samples stored in advance in the first memory 130 of the electronic device 101 to the schedule table 1111. For example, the schedule sample (office attendance sample 1141) may be added to the schedule table 1111, as a schedule 1121, by a drag-and-drop input (user input). According to one embodiment, the display 160 of the electronic device 101 may display a notification window 1131 for the schedule 1121 added by the user to the schedule list 1111, thereby displaying detailed information of the schedule 1121 added to the schedule table 1111 or receiving the detailed information from the user. The electronic device 101 may control each of the devices designated by each of the schedules for each corresponding time according to each of the schedules (e.g., the schedule 1121) included in the schedule table 1111.

Referring to FIG. 11B, the electronic device 101 may perform scheduling for the control of devices using the electronic device 101 according to user input from a user 1152. At this time, the user 1152 may schedule the devices by adding the web page 1010 as shown in FIG. 10, or may schedule samples stored in advance in the first memory 130 of the electronic device 101 to a schedule table 1112 displayed on the display 160 of the electronic device 101. In FIG. 11B, the user 1152 may determine schedules of devices, that is, a TV, lighting, and a coffee machine, from 6:30 am to 7:30 am by adding the web page 1010 or a first schedule 1142 for the TV, a second schedule 1143 for the lighting, and a third schedule 1144 for the coffee machine among the schedule samples stored in advance in the first memory 130 of the electronic device 101 to the schedule table 1112. For example, the schedule samples 1142 to 1144 may be added to the schedule table 1112, as a schedule 1122, by a drag-and-drop input (user input). According to one embodiment, the display 160 of the electronic device 101 may display a notification window 1132 for the schedule 1122 added by the user to the schedule table 1112 on the schedule table 1111, thereby displaying detailed information of the schedule 1122 added to the schedule table 1112 or receiving the detailed information from the user.

According to one embodiment of the present disclosure, in a storage medium storing commands, the commands are set, when executed by at least one processor, to cause the at least one processor to perform at least one operation, wherein the at least one operation may include operations of receiving content including at least one object from a web server; in response to the object being selected, acquiring, from the object, device control information indicating at least one first device and device control information including a first command for operating the at least one first device; and transmitting the first command to the at least one first device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. A method for receiving content at an electronic device, the method comprising:
   receiving content including at least one object from a server;
   in response to an object being selected from the at least one object, acquiring device information indicating at least one first device related the object and device control information including a first command for operating the at least one first device based on the content received from the server; and
   transmitting the first command to the at least one first device,
   wherein the method further comprises:
   discovering devices connected to the electronic device;
   when the at least one first device is not included in the discovered devices, selecting a second device from the discovered devices capable of replacing the at least one first device based on the device information;
   converting the first command into a second command capable of being applied to the second device; and
   transmitting the second command to the second device.

2. The method of claim 1, wherein the device control information has a uniform resource locator (URL) type.

3. The method of claim 1, wherein transmitting the first command to the at least one first device comprises:
   transmitting the device information and the first command to another server connected to the at least one first device.

4. The method of claim 1, wherein transmitting the first command to the at least one first device comprises:
   when a preset time or a time set by a user elapses, transmitting the first command to the at least one first device.

5. The method of claim 1, further comprising:
   setting a script for controlling an operation of one of the devices connected to the electronic device; and
   transmitting the script to a corresponding device so that the corresponding device is operated according to the script.

6. The method of claim 1, wherein the device control information is transmitted from the server to the electronic device if the object is selected.

7. An electronic device for receiving content, comprising:
   a communication interface; and
   a processor configured to control to:
   receive content including at least one object from a server;
   in response to an object being selected from the at least one object, acquire device information indicating at least one first device related to the object and device control information including a first command for operating the at least one first device based on the content received from the server, and control the communication interface to transmit the first command to the at least one first device, wherein the processor is further configured to:

discover devices connected to the electronic device, when the at least one first device is not included in the discovered devices, select a second device from the discovered devices capable of replacing the at least one first device based on the device information, convert the first command into a second command capable of being applied to the second device, and control the communication interface to transmit the second command to the second device.

8. The electronic device of claim 7, wherein the device control information has a type of a URL.

9. The electronic device of claim 7, wherein the processor is configured to control the communication interface to transmit the device information and the first command to another server connected to the at least one first device.

10. The electronic device of claim 7, wherein the processor is configured to control the communication interface to transmit the first command to the at least one first device if a preset time or a time set by a user elapses.

11. The electronic device of claim 7, wherein the processor is configured to:

set a script for controlling an operation of one of the devices connected to the electronic device according to a user input, and control the communication interface to transmit the script to a corresponding device so that the corresponding device is operated according to the script.

12. The electronic device of claim 7, wherein the device control information is transmitted from the server to the electronic device if the object is selected.

13. A non-transitory computer-readable storage medium storing commands, in which the commands are set, when executed by at least one processor, to cause the at least one processor to perform at least one operation, wherein the at least one operation includes operations of;

receiving content including at least one object from a server;

in response to an object being selected from the at least one object, acquiring device information indicating at least one first device related to the object and device control information including a first command for operating the at least one first device based on the content received from the server; and transmitting the first command to the at least one first device;

discovering devices connected to the electronic device;

when the at least one first device is not included in the discovered devices, selecting a second device from the discovered devices capable of replacing the at least one first device based on the device information;

converting the first command into a second command capable of being applied to the second device: and transmitting the second command to the second device.

* * * * *